United States Patent [19]
Sato et al.

[11] Patent Number: 5,637,396
[45] Date of Patent: Jun. 10, 1997

[54] INNER SEALING MATERIAL

[75] Inventors: Hiroshi Sato; Ryota Ogawa, both of Tokyo, Japan

[73] Assignee: Toppan Printing Co., Ltd., Tokyo, Japan

[21] Appl. No.: 437,564

[22] Filed: May 9, 1995

Related U.S. Application Data

[63] Continuation of Ser. No. 73,055, Jun. 8, 1993, abandoned.

[30] Foreign Application Priority Data

Dec. 11, 1991 [JP] Japan ................... 3-350826

[51] Int. Cl.$^6$ ............................... B32B 15/08
[52] U.S. Cl. ............... 428/349; 428/43; 428/195; 428/200; 428/209; 428/346; 428/347; 428/344; 428/352; 428/355 EN; 428/447; 428/511; 428/520
[58] Field of Search ............ 428/43, 35.7, 35.8, 428/511, 520, 461, 317.1, 318.4, 318.6, 200, 209, 195, 447, 352, 344, 354, 355, 351, 346, 349, 347; 215/232, 347

[56] References Cited

U.S. PATENT DOCUMENTS

| | | | |
|---|---|---|---|
| 3,963,845 | 6/1976 | Dukess | 428/64 |
| 4,579,240 | 4/1986 | Ou-Yang | 215/230 |
| 4,596,338 | 6/1986 | Yousif | 215/232 |
| 4,666,052 | 5/1987 | Ou-Yang | 215/230 |
| 4,697,719 | 10/1987 | Allen | 220/258 |
| 4,722,447 | 2/1988 | Crisci | 215/232 |
| 4,917,949 | 4/1990 | Yousif | 428/349 |
| 4,960,216 | 10/1990 | Giles et al. | 215/232 |
| 4,981,229 | 1/1991 | Lanham | 215/232 |
| 5,197,618 | 3/1993 | Goth | 215/232 |

FOREIGN PATENT DOCUMENTS 4020371  12/1991  Germany.

OTHER PUBLICATIONS

Database WPI, Week 9330, Derwent Publications Ltd., London, AN 93-239748.
Patent Abstracts of Japan, vol. 16, No. 282 (M-1269), Jun. 23, 1990.
Patent Abstracts of Japan, vol. 14 No. 29 (M-922), Jan. 19, 1990.
Database WPI, Week 8944, Derwent Publications Ltd., London, AN 89-321340.
Patent Abstracts of Japan, vol. 16, No. 226 (M-1254), May 26, 1992.

*Primary Examiner*—James J. Seidleck
*Assistant Examiner*—Michael A. Williamson
*Attorney, Agent, or Firm*—Staas & Halsey

[57] ABSTRACT

An improved inner sealing material, which is fitted in a cap of a container has basically a membrane layer having at least a metal layer and a reseal layer having at least an elastic sheet layer, with said membrane and reseal layers being superposed in such a way that one can be separated from the other. The topmost part of the membrane layer is formed of a release layer that is made of a mixture of an acrylic resin and a chlorinated vinyl acetate base resin and which is overlaid with an adhesive layer made of a chlorinated polypropylene base resin whereas the bottommost part of the reseal layer has a polypropylene base resin layer. The inner sealing material can be subjected to high-frequency sealing without losing the inherent capability of assuring smooth separation between the membrane and reseal layers.

10 Claims, 5 Drawing Sheets

Fig. 5
Fig. 4
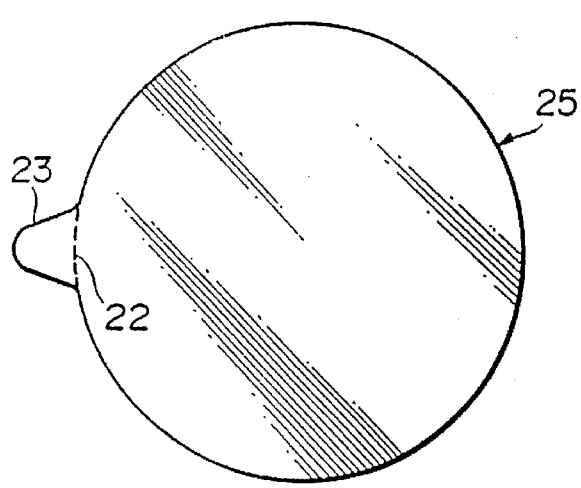
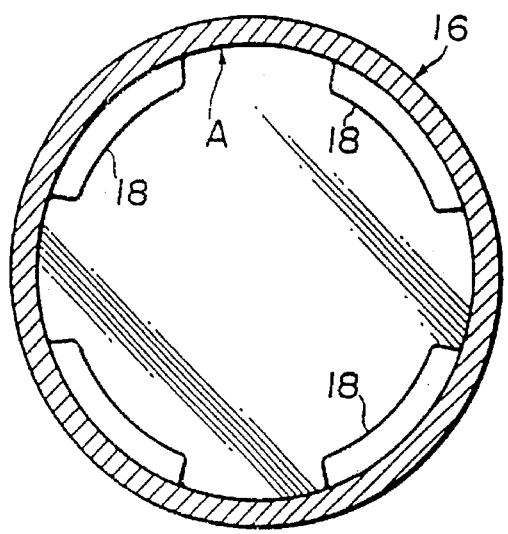
Fig. 6
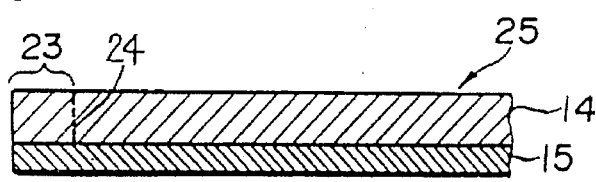
Fig. 7
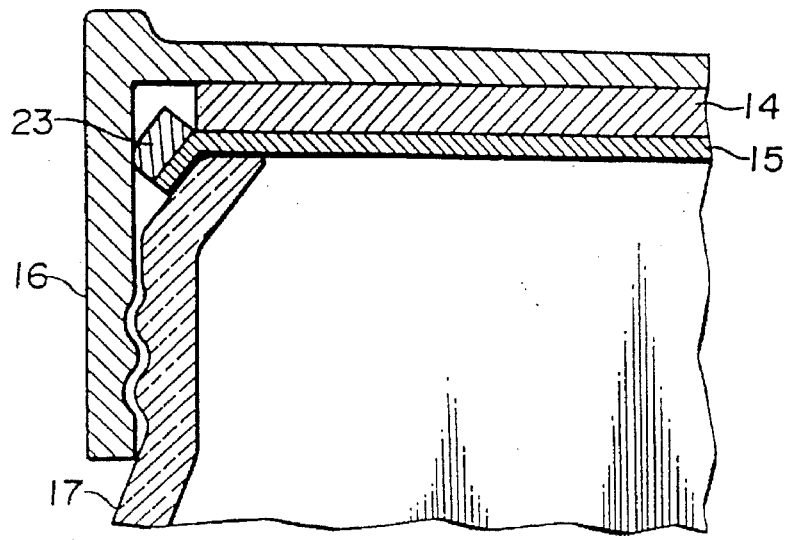

INNER SEALING MATERIAL

This application is a continuation of application Ser. No. 08/073,055, filed Jun. 8, 1993, now abandoned.

BACKGROUND OF THE INVENTION

This invention relates to an inner sealing material for closing the mouth of a container and, more particularly, to an inner sealing material of a type that is to become effective by high-frequency sealing.

The mouths of containers of powdered or granular materials such as instant coffee, powder milk and flavorings are fitted with an inner sealing material which is fitted into the cap of the container for protecting the contents from deterioration in quality due to various factors such as contact with moisture and oxidation. The inner sealing material is a combination of a reseal layer that is based on an elastic sheet such as cardboard and a membrane layer (seal layer) that is based on a metal foil such as aluminum foil. When the container is untapped, the reseal layer is separated from the membrane layer and remains in the cap whereas the membrane layer is left on the mouth of the container. When the cap is replaced on the mouth of the container, the reseal layer is superposed on the membrane layer (which may be removed either partly or entirely) so that it combines with the cap to prevent the entrance of moisture, oxygen, etc., into the container.

To bond the membrane layer onto the mouth of the container, emulsion based adhesives have heretofore been used, but this has involved several problems when the user attempts to open the container by peeling the membrane layer from its mouth. To name a few, "picking", or the destruction of the glassine paper used in the membrane, occurs, and difficulty is encountered in peeling the membrane layer neatly. With a view to solving these problems, a high-frequency sealing method has been developed as a technique that enables the mouth of a container to be sealed with a thin film that can be bonded to the mouth in a fast and easy way and which yet can be peeled neatly as required at a later time (see, for example, Japanese Patent Publication (kokoku) Nos. Sho 61-9181 and 63-28019, and Hei 3-2754).

This high-frequency sealing method causes the metal layer in the inner sealant to generate heat when it is placed in a magnetic field and the thus generated heat is utilized to fuse the thermal bonding resin layer (glass seal layer) at the bottom of the membrane layer, thereby providing an effective seal. However, if this method is applied to the conventional inner sealants, serious problems have occurred in association with the ability to insure effective separation between the reseal and membrane layers, as exemplified by the loss in the ability of the release layer (which forms the topmost part of the membrane layer) to insure good release on account of heat generation, and inconsistency in peel strength that is caused by thermal dissolution of the layer to be bonded which forms the bottommost part of the reseal layer.

SUMMARY OF THE INVENTION

The present invention has as an object to provide an inner sealing material that will insure effective release even if it is subjected to high-frequency sealing.

This object can be attained by an inner sealing material that comprises basically a membrane layer having at least a metal layer and a reseal layer having at least an elastic sheet layer, with the membrane and reseal layers being superposed in such a way that one can be separated from the other. The inner sealing material is characterized in that the topmost part of the membrane layer comprises a release layer that is made of a mixture of an acrylic resin and a chlorinated vinyl acetate base resin and which is overlaid with an adhesive layer made of a chlorinated polypropylene base resin, whereas the bottommost part of the reseal layer comprises a polypropylene base resin layer.

In the inner sealing material of the present invention, the release layer which forms the topmost part of the membrane layer has sufficient heat resistance to maintain a good release capability even after high-frequency sealing and, in addition, the layer to be bonded which forms the bottommost part of the reseal layer is also composed of a heat-resistant material and, hence, it can be subjected to high-frequency sealing without melting and consistent peel strength is maintained. With these two effects combined together, the inner sealing material of the present invention will assure satisfactory separation between the membrane and reseal layers in a consistent manner.

BRIEF DESCRIPTION OF THE DRAWINGS

FIG. 4 is a plan view of the cap of FIG. 2;

FIG. 5 is a plan view of a second embodiment of the inner sealing material of the present invention;

FIG. 6 is a cross-section of the inner sealing material shown in FIG. 5;

FIG. 7 is a cross-sectional view showing the second embodiment of the inner sealing material as it is fitted into the cap of a container which in turn is placed on the mouth of the container;

DETAILED DESCRIPTION OF THE INVENTION

Embodiments of the present invention are described below with reference to the accompanying drawings.

Figure 1:
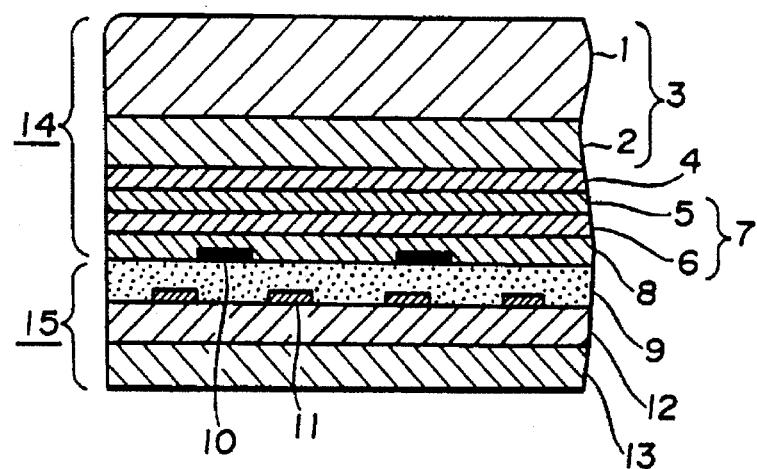
FIG. 1 is a cross-sectional view showing a first embodiment of the inner sealing material of the present invention.

FIG. 1 is a cross-sectional view showing an example of an inner sealing material of the present invention. As shown, a metal layer 12 such as an aluminum foil is placed over a thermoplastic glass sealant layer 13. If necessary, a patterned layer 11 may be printed on the top surface of the metal layer 12. The patterned layer 11 is further overlaid with a clear release layer 9 and an adhesive layer 10. The release layer 9 has weak affinity for polypropylene-base resins and is composed of a mixture of an acrylic resin and a chlorinated vinyl acetate base resin, and the adhesive layer 10 is composed of a chlorinated polypropylene base resin. The layers listed above combine together to form a membrane layer 15.

A polypropylene base resin layer 8 to be bonded is provided over the release layer 9 and the adhesive layer 10. The layer 8 is further overlaid with a coextruded film layer 7, a polyethylene layer 4, and an elastic sheet layer 3, which layers combine together to form a reseal layer 14. The coextruded film layer 7 consists of a polyethylene layer 5 and a polypropylene layer 6, and the elastic sheet layer 3 has a cardboard 1 superposed on a foamed polyethylene layer 2.

Having the construction described above, the inner sealing material of the present invention is so adapted that the reseal layer 14 and the membrane layer 15 can separate from each other at the interface between the release layer 9 and adhesive layer 10 of the membrane layer 15, and the polypropylene base resin layer 8 of the reseal layer 14.

The metal layer 12 has dual purposes. One is to prevent the permeation of moisture and oxygen into a container, and the other is to enable the application of a high-frequency sealing. The metal layer 12 may be made of an aluminum foil either alone or as reinforced with a synthetic resin. Alternatively, it may be made of a synthetic resin film on which an aluminum layer is formed by evaporation.

The glass sealant layer 13 is typically made of a thermoplastic polyethylene resin.

The release layer 9 is formed of a mixture of an acrylic resin and a chlorinated vinyl acetate base resin. To insure more consistency in the release property, a suitable third component, say, a silicone resin is desirably added in an amount of 1–10%, preferably 2–5%. The release layer 9 can typically be formed by gravure coating using a gravure cylinder which is grayed with a depth of 60 μm. The mixing proportions of the acrylic and chlorinated vinyl acetate base resins are not limited to any particular values. However, from the viewpoint of heat resistance and the release property, the mixing ratio is preferably within the range from 7.5:2.5 to 9:1. If the proportion of the acrylic resin exceeds 90%, the mixture resin becomes so hard (increases in viscosity) that difficulty is encountered in its application to the metal layer 12. If the proportion of the acrylic resin is less than 75%, the heat resistance of the mixture resin decreases so much that its release property will deteriorate upon exposure to elevated temperatures.

The inner sealing material will adhere to a container (e.g., a glass jar) when the polyethylene in the bottommost part of the inner sealing material (i.e., the glass sealant layer 13) fuses under the heat generated by the application of high frequency to the metal in the metal layer 12. Hence, the metal layer 12 in the inner sealing material will generate heat to raise the temperature at least to the point where the polyethylene in the glass sealant layer 13 melts. The generated heat will naturally raise the temperature of the release layer 9 but its heat resistance varies with the type of resin used and if its heat resistance is low, its release property will be damaged. To have the polyethylene adhere to the mouth of the glass jar, it must be heated typically at about 170°–180° C.. Therefore, the release layer 9 must be made of a material that can withstand heating, without deterioration in the release property, to at least the temperature at which the glass sealant layer 13 exhibits the necessary sealing quality.

The mouth of a container is preferably subjected to a preliminary treatment in order to provide enhanced adhesion to the inner sealant. An example of such treatment is to apply an ionomer or polyolefin resin coat onto the mouth of the container.

Experiment

To evaluate the applicability to the release layer 9, the resins listed in Table 1 below were tested by the following procedure. Each of the test resins was coated on an aluminum foil. A polypropylene film was superposed and heat sealed. The sealing temperature was varied and the point at which satisfactory separation between the release layer and the polypropylene film could no longer be achieved was measured. In addition, the back side of the aluminum foil was laminated with polyethylene which, in turn, was heat sealed to the mouth of a glass jar at varying temperatures. The adhesion to the mouth of the glass jar was checked at the respective seal temperatures.

TABLE 1

| Resin*[1] | Mixing ratio | Temperature at which the release property was lost, °C. | Adhesion to the mouth of glass jar |
|---|---|---|---|
| Acrylic/chlorinated vinyl acetate | 7:3 | 150 | X |
| Acrylic/chlorinated vinyl acetate | 7.5:2.5 | 170 | Δ |
| Acrylic/chlorinated vinyl acetate | 8:2 | 220 | O |
| Acrylic/chlorinated vinyl acetate | 9:1 | 250 | O |
| Chlorinated rubber | — | 120 | XX |
| Polyamide | — | 100 | XX |

*[1]Each resin had a silicone resin added in an amount of ca. 3%.
*[2]The adhesion was evaluated by the following criteria: O, satisfactory; Δ, less satisfactory but still acceptable; X, poor; XX, pratically no adhesion.

The data in Table 1 show that when the combination of an acrylic resin and a chlorinated vinyl acetate base resin was used in accordance with the present invention, heat sealing could be performed at elevated temperatures without causing a substantial drop in release quality. Particularly good results were attained when the mixing proportions of the two resins were within the range from 7.5:2.5 to 9:1.

Another experiment was conducted under the same conditions except that the polypropylene film was replaced by a polyethylene film; as it turned out, the polyethylene film melted and fused to the resin of the release layer, whereby the two layers could not be separated smoothly.

The adhesive layer 10 is made of a chlorinated polypropylene base resin and a graft polymerized version of chlorinated polypropylene base resin is particularly preferred. If desired, an additive such as an antiblocking agent or a softening agent may be added to the adhesive layer 10. The adhesive layer 10 need not be provided to cover the entire surface of the release layer 9; it is preferably provided to form a certain pattern, say, a dotted pattern, a checkerboard pattern or a stripe, covering 3–30% of the total area of the release layer 9.

In the embodiment shown in FIG. 1, the elastic sheet layer 3 which is part of the reseal layer 14 consists of the cardboard 1 placed in superposition on the foamed polyethylene layer 2. The elastic sheet layer 3 may be formed of any material that satisfies the following two conditions: one is that the layer 3 should compress the membrane layer 15 uniformly against the mouth of a container when the inner sealing material is to be fitted on the container; and the other condition is that even if the container is recapped after removing the membrane layer 15, the reseal layer 14 should seal completely to the mouth of the container.

The coextruded film layer 7 which is another part of the reseal layer 14 serves to insure that the polypropylene base resin layer 8 which is be bonded will fuse under heat to the foamed polyethylene layer 2 in the elastic sheet layer 3 via the coextruded film layer 7, thereby stabilizing the bond between the layers 8 and 2.

Figure 2:
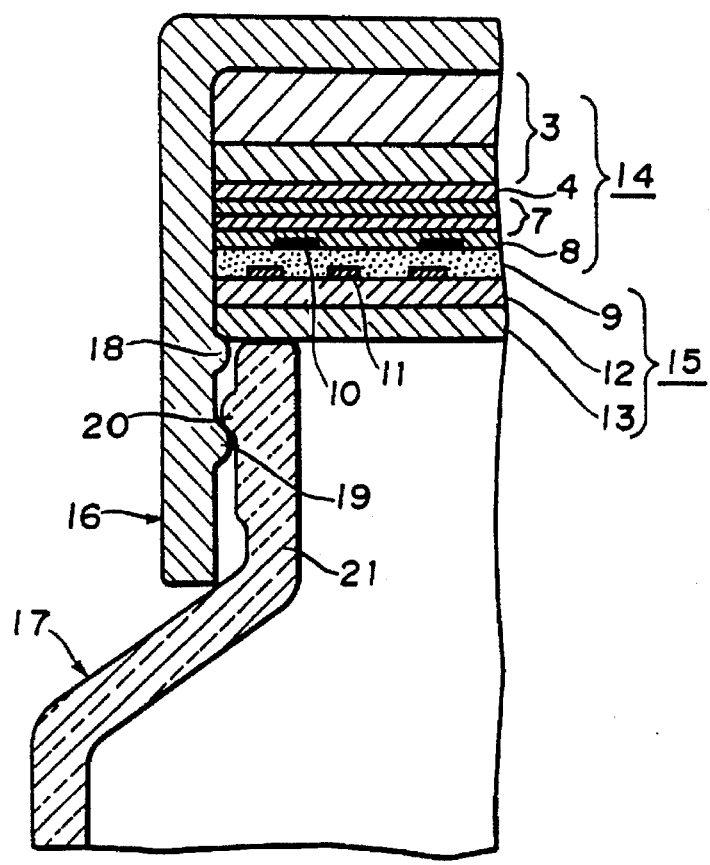
FIG. 2 is a cross-sectional view showing the first embodiment of the inner sealing material as it is fitted into the cap of a container which in turn is placed on the mouth of the container.

FIG. 2 is a cross-sectional view showing the inner sealing material as it is fitted into the cap of a container which in turn is threaded over the mouth of the container. In FIG. 2, numeral 16 denotes the cap, 17 refers to the body of the container, 18 represents ribs projecting from the inner surface of the side wall of the cap, 21 signifies the neck of the container, 20 denotes the thread on the outer surface of the neck of the container, and 19 refers to the thread on the inner surface of the side wall of the cap. As shown in FIG. 4, the ribs 18 are four in number and spaced at appropriate intervals on the same height. As shown in FIG. 2, the inner sealant is retained by the ribs 18 on the inner surface at the top of the cap 16 in such a way that it is rotatable within the plane of retention relative to the cap 16. When the cap 16 is threaded over the mouth of the container, the resiliency of the elastic sheet layer 3 causes the inner sealing material in the cap 16 to contact the mouth of the container. Then, the contact area is passed through a magnetic field in high-frequency induction heating, whereby the mouth of the container is bonded completely to the glass sealant layer 13 in the inner sealing material.

Figure 3:
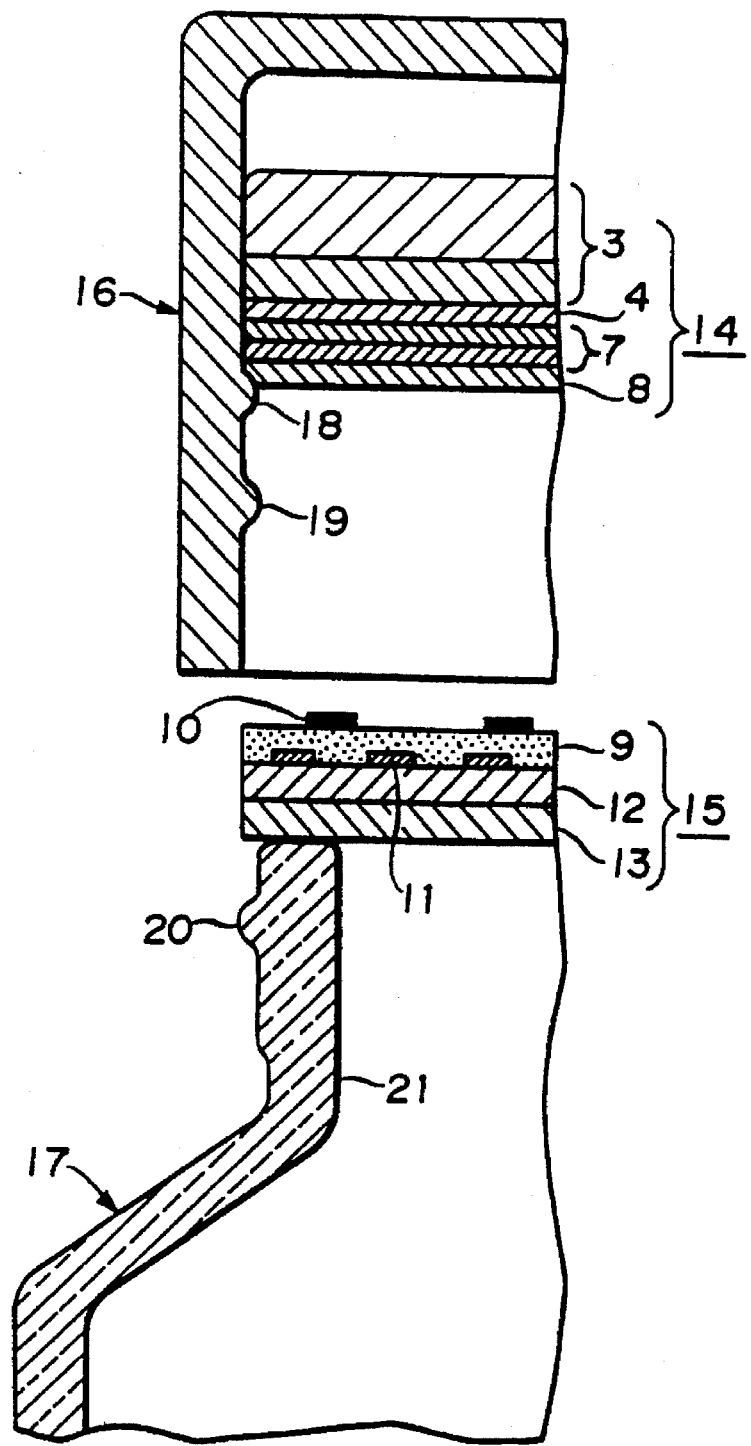
FIG. 3 is a cross-sectional view showing the container of FIG. 2 as uncapped, with the reseal layer remaining in the cap whereas the membrane layer is left at the mouth of the container.

In the next place, the cap 16 is loosened and removed from the mouth of the container. As shown in FIG. 3, separation occurs at the interface between the polypropylene base resin layer 8 and the release layer 9 and the reseal layer 14 remains in the cap 16 whereas the membrane layer 15 is left on the mouth of the container.

The inner sealing material of the present invention has the advantage that it can be subjected to high-frequency sealing and yet the inherent capability of the release layer will not be lost, nor will there be any inconvenience such as inconsistent peel strength that would otherwise occur on account of the dissolution of the layer to be bonded. As a result, effective separation is assured between the reseal and membrane layers in a consistent manner.

The membrane layer 15 may be removed completely from the mouth of the container. Alternatively, only part of the membrane layer 15 may be removed while the remainder is left at the mouth of the container. If the container is recapped after the removal of the membrane layer 15, the resiliency of the elastic sheet layer 3 will permit the opening of the container to be effectively closed.

The process for producing the inner sealant of the present invention is described below with reference to FIG. 1.

(1) First, a web of aluminum foil (moistureproof material) is unrolled and a polyethylene coat which is to serve as a glass sealant layer is applied to one side of the web by extrusion lamination.

(2) Then, a print of a patterned layer, a release layer composed of a mixture of an acrylic resin and a chlorinated vinyl acetate base resin, and a dotted adhesive layer made of a chlorinated polypropylene base resin are coated succesively on the other side of the aluminum foil by gravure coating or printing, whereby a membrane layer is formed.

(3) A film of molten polypropylene is extruded between a preliminarily coextruded polypropylene/polyethylene film and the membrane layer formed in step (2), whereby the two members are sandlaminated.

(4) A film of molten polyethylene is extruded between the resulting laminate and a cardboard/foamed polyethylene laminate that has been preliminarily formed with the aid of wax (not shown), whereby the two members are sandlaminated.

(5) The resulting assembly is punched out in a circular form having an outside diameter corresponding to the inner diameter of the cap 16, thereby yielding an inner sealant as the final product.

FIGS. 5–9 show another embodiment of the inner sealing material of the present invention. This embodiment is identical to the first embodiment in that the inner sealing material generally indicated by 25 consists of the reseal layer 14 and the membrane layer 15. The only difference is that a seal opening tab 23 is provided in a selected area of the periphery as shown in FIG. 5. The tab 23 is clearly demarcated from the other areas of the inner sealing material by a break line 22. Examples of the break line 22 include a folding crease, a perforation and a half-cut. For the purposes of the present invention, the break line 22 is preferably a half-cut 24 as shown in FIG. 6 and this is formed by making a cut at least through the reseal layer 14 of the inner sealing material.

When the inner sealing material having the construction described above is fitted into the cap 16, the tab 23 bends down along the break line 22 and is pressed against the inner surface of the side wall of the cap 16, as shown in FIG. 7. It should be noted here that the tab 23 is desirably provided in an area of the inner sealing material that corresponds to one of the areas where the ribs 18 are not formed (as indicated by A in FIG. 4). As in the first embodiment, the cap is threaded over the mouth of the container body 17 and subjected to high-frequency sealing to close the mouth in an effective way.

Figure 8:
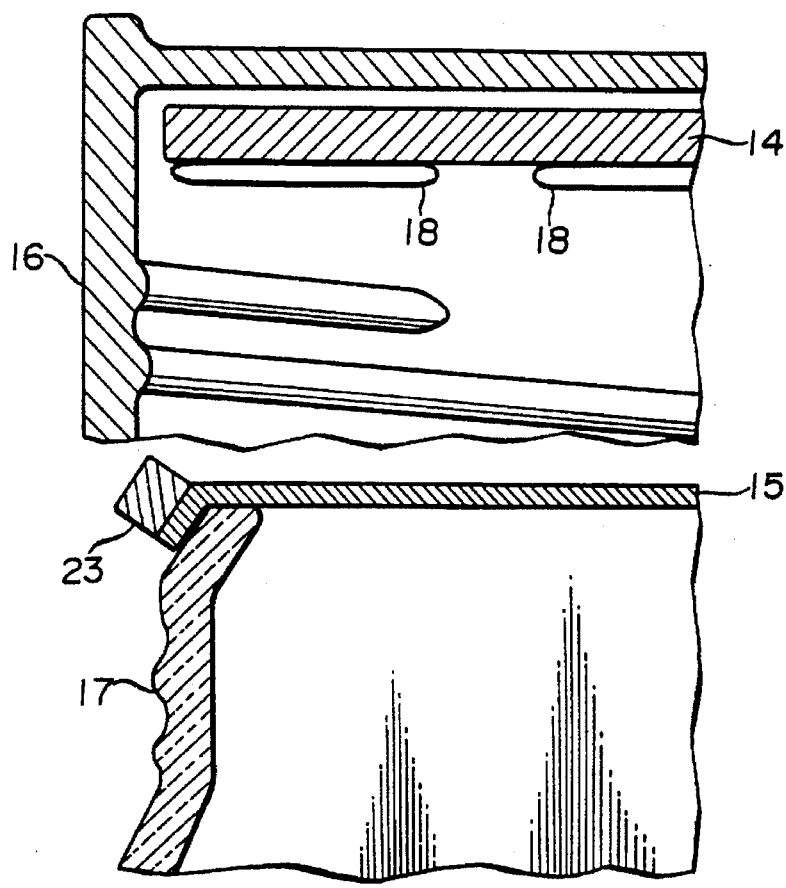
FIG. 8 is a cross-sectional view showing the container of FIG. 7 in an uncapped state.
Figure 9:
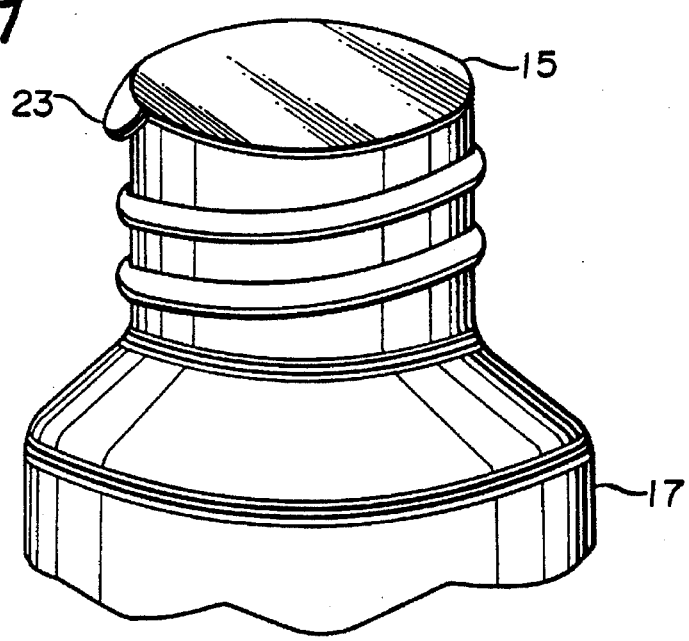
FIG. 9 is a perspective view showing the container of FIG. 7 as uncapped, with the membrane layer being left at the mouth of the container.

The user then loosens and removes the cap 16. If the break line 22 is a half-cut 24 as shown in FIGS. 6 and 7, the reseal layer 14 will separate from the membrane layer 15 except in the area where the tab 23 is provided, as shown in FIGS. 8 and 9. In other words, the tab 23 will remain on the membrane layer 15 that adheres to the mouth of the uncapped container. By pulling the tab 23, the membrane layer 15 can be peeled from the mouth of the container in a very easy way.

In order to make a half-cut that extends at least through the reseal layer 14, not only pressure but also high precision is necessary to operate the cutting blade. It should, however, be noted that the making of a half-cut can be done consistently by heating the moving blade so that the resin layer will melt.

If the break line 22 is in the form of a folding crease or a perforation, the projecting part of the membrane will function as a tab and it can be opened (peeled from the mouth of the container) more readily than in the case where no such tab is formed.

Figure 10:
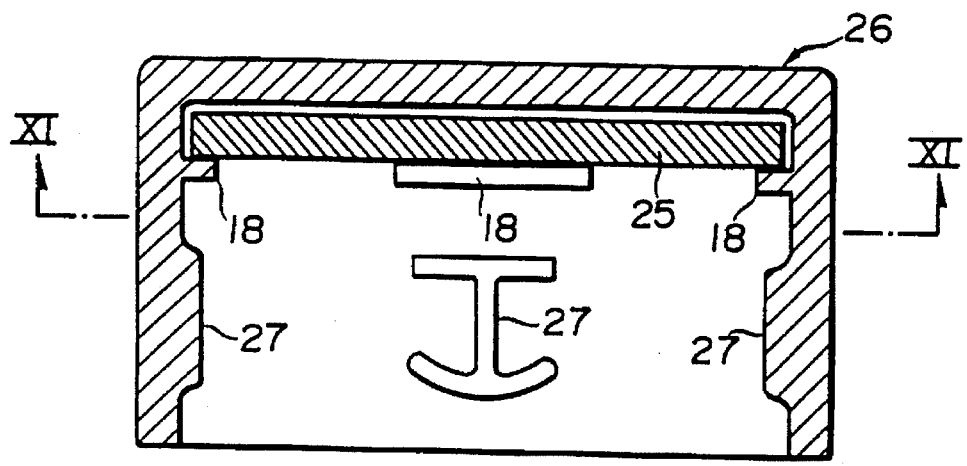
FIG. 10 is a cross-sectional view showing a third embodiment of the inner sealing material of the present invention as it is fitted into the cap of a container.
Figure 11:
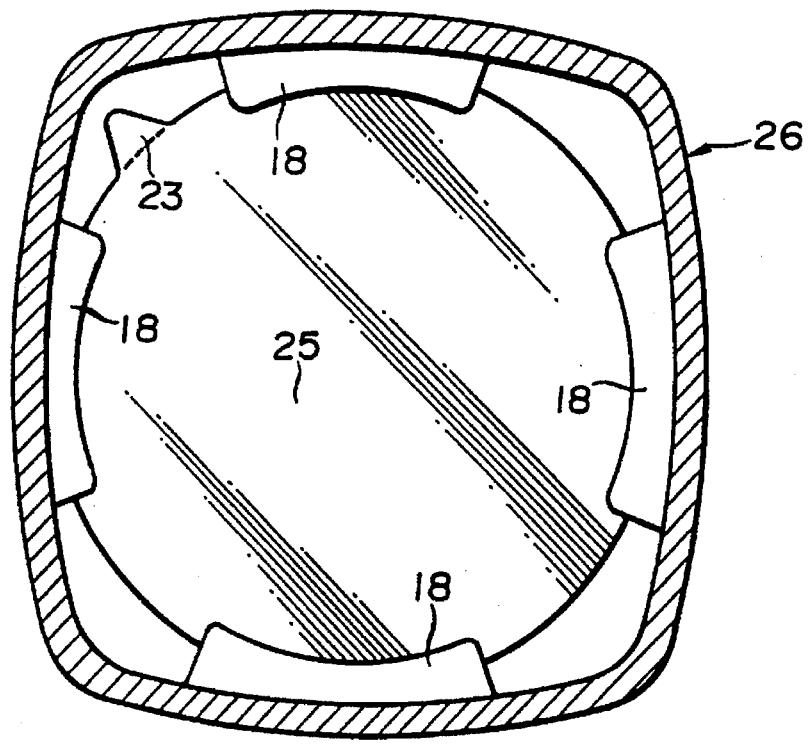
FIG. 11 is a plan view of the third embodiment as it is seen along line XI—XI of FIG. 10.

The foregoing embodiments refer to the case where the cap is in a circular form but it should be understood that the concept of the present invention is also applicable to the case where the cap is in a form other than circular. Consider, for example, the instant coffee marketed from Nestle Japan Co., Ltd. under the trade name "Gold Blend®". The container of this instant coffee has a generally square cap that is fitted with a disk of inner sealant. If the tabbed inner sealing material of the present invention described above is to be applied to this cap, it is recommended that the tab 23 be located in an area that corresponds to a corner of the cap 26 as shown in FIGS. 10 and 11. In FIGS. 10 and 11, numeral 27 designates a mechanism that is equivalent to the thread on the ordinary circular cap and which cooperates with the neck of the container when uncapping it.

As described in detail on the foregoing pages, the inner sealing material of the present invention can be subjected to high-frequency sealing and yet it maintains a satisfactory release capability while retaining consistent peel strength. Hence, taken as a whole, the inner sealing material will provide good separation between the reseal and membrane layers in a consistent manner. Thus, one of the major advantages of the inner sealing material of the present invention is that it is particularly suitable for application of high-frequency sealing.

Another advantage of the inner sealing material is that the removal of the membrane layer from the mouth of an uncapped container is greatly facilitated by providing a seal opening tab in a selected area of the periphery of the inner sealing material. If the tab is demarcated from the other areas of the sealant by a half-cut, part of the reseal layer will remain on the membrane layer when the cap is loosened and removed from the container and it reinforces the tab to further facilitate the peeling of the membrane layer from the mouth of the container.

What is claimed is:

1. An inner sealing material which adheres to a mouth of a container by high-frequency sealing, said inner sealing material comprising:
   a membrane layer having;
      a glass sealant layer which is a heat-sensitive resin layer and forms a bottommost portion of the inner sealing material, for adhering to the mouth of the container by the high-frequency sealing;
      a metal layer formed on said glass sealant layer,
      a release layer formed on said metal layer and made of a mixture of an acrylic resin and a chlorinated vinyl acetate base resin, wherein a mixing ratio of said acrylic resin to said chlorinated vinyl acetate base resin in said release layer is within a range from 7.5:2.5 to 9:1, and
      an adhesive layer which partially overlays said release layer and made of a chlorinated polypropylene base resin; and
   a reseal layer formed on and separable from said membrane layer, and having;
      a polypropylene base resin layer attached to but separable from said release layer and said adhesive layer, and
      an elastic sheet layer formed on said polypropylene base resin layer.

2. An inner sealing material according to claim 1, wherein the resin, forming said release layer made of said acrylic resin and said chlorinated vinyl acetate base resin, further has a silicone resin mixed therewith in an amount of 1–10%.

3. An inner sealing material according to claim 1, wherein said metal layer is one of an aluminum foil, an aluminum foil reinforced with a synthetic resin, and a synthetic resin film on which an aluminum coat is formed by evaporation.

4. An inner sealing material according to claim 1, wherein said reseal layer comprises;
   said polypropylene base resin layer;
   a coextruded film layer formed on said polypropylene base resin layer and comprising a polyethylene layer and a polypropylene layer;
   a polyethylene layer formed on said coextruded film layer; and
   said elastic sheet layer formed on said polyethylene layer and comprising a cardboard and a foamed polyethylene layer.

5. An inner sealing material according to claim 1, further comprising:
   a seal opening tab extending from a selected area of a periphery of said inner sealing material and demarcated at the periphery from the other areas of said inner sealing material by a break line.

6. An inner sealing material according to claim 5, wherein said break line is a half-cut that extends at least through said reseal layer.

7. An inner sealing material according to claim 1, wherein said membrane layer further comprises:
   a patterned layer printed on the surface of said metal layer which contacts said release layer.

8. An inner sealing layer according to claim 1, wherein said adhesive layer covers 3–30 percent of a surface of the release layer on which said adhesive layers overlays.

9. An inner sealing material which adheres to a mouth of a container by high-frequency sealing, said inner sealing material comprising:
   a membrane layer for adhering to the mouth of the container, and comprising;
      a glass sealant layer which is a heat-sensitive resin layer and forms a bottommost portion of the inner sealing material, for adhering to the mouth of the container by the high-frequency sealing,
      a metal layer formed on said glass sealant layer,
      a release layer formed on said metal layer and made of a mixture of an acrylic resin and a chlorinated vinyl acetate base resin, said release layer being formed by gravure coating, wherein a mixing ratio of said acrylic resin to said chlorinated vinyl acetate base resin in said release layer is within a range from 7.5:2.5 to 9:1, and
      an adhesive layer made of a chlorinated polypropylene base resin and which partially overlays said release layer; and
   a reseal layer formed on but separable from said membrane layer, and comprising;
      a polypropylene base resin layer formed on said release and adhesive layers, and
      an elastic sheet layer forming an upper portion of said reseal layer.

10. An inner sealing layer according to claim 9, wherein said adhesive layer covers 3–30 percent of a surface of the release layer on which said adhesive layers overlays.

* * * * *